(12) United States Patent
Ho et al.

(10) Patent No.: US 9,652,378 B2
(45) Date of Patent: May 16, 2017

(54) WRITING METHOD, MEMORY CONTROLLER AND MEMORY STORAGE DEVICE

(71) Applicant: PHISON ELECTRONICS CORP., Miaoli (TW)

(72) Inventors: Kuo-Hwa Ho, Miaoli (TW); Kheng-Chong Tan, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 83 days.

(21) Appl. No.: 13/950,284

(22) Filed: Jul. 25, 2013

(65) Prior Publication Data

US 2014/0325119 A1  Oct. 30, 2014

(30) Foreign Application Priority Data

Apr. 26, 2013 (TW) .............................. 102115080 A (51) Int. Cl.
*G06F 13/12* (2006.01)
*G06F 13/38* (2006.01)
*G06F 12/02* (2006.01)

(52) U.S. Cl.
CPC .. *G06F 12/0246* (2013.01); *G06F 2212/1016* (2013.01); *G06F 2212/7201* (2013.01); *G06F 2212/7202* (2013.01); *G06F 2212/7208* (2013.01)

(58) Field of Classification Search
CPC ................................................ G06F 2212/7203
USPC ............................................................ 710/62
See application file for complete search history.

(56) References Cited

U.S. PATENT DOCUMENTS

| | | | | |
|---|---|---|---|---|
| 5,835,772 A | * | 11/1998 | Thurlo ........................... | 717/139 |
| 2010/0332732 A1 | * | 12/2010 | Chiang et al. ................. | 711/103 |
| 2011/0004723 A1 | * | 1/2011 | Kheng-Chong .............. | 711/103 |

* cited by examiner

*Primary Examiner* — Chun-Kuan Lee
(74) *Attorney, Agent, or Firm* — Jianq Chyun IP Office (57) ABSTRACT

A writing method, a memory controller and a memory storage device are provided. The writing method includes steps of: configuring logical addresses to map to part of physical programming units in a storage area, wherein at least one of the physical programming units stores a valid data; transmitting a first write command for writing data having a first data length to at least one of the physical programming units; receiving a status signal; and selecting a spare physical erasing unit and copying the valid data having a second data length to the spare physical erasing unit, after transmitting the first write command and before receiving the status signal, wherein the first data length is not greater than the second data length. Therefore, it prevents a host system from waiting too long when writing data.

30 Claims, 8 Drawing Sheets

WRITING METHOD, MEMORY CONTROLLER AND MEMORY STORAGE DEVICE

CROSS-REFERENCE TO RELATED APPLICATION

This application claims the priority benefit of Taiwan application serial no. 102115080, filed on Apr. 26, 2013. The entirety of the above-mentioned patent application is hereby incorporated by reference herein and made a part of this specification.

BACKGROUND

Technology Field

The invention relates to a writing method, and more particularly, to a writing method for a rewritable non-volatile memory module, and a memory controller and a memory storage device using the same.

Description of Related Art

The markets of digital cameras, cellular phones, and MP3 players have expanded rapidly in recent years, resulting in escalated demand for storage media by consumers. The characteristics of data non-volatility, low power consumption, and compact size make the rewritable non-volatile memory module (e.g., flash memory) ideal for being built in the portable multi-media devices as cited above.

A common rewritable non-volatile memory module usually includes multiple physical blocks, and each physical block includes multiple physical pages. Since a filled physical block before being erased cannot be used for re-writing data, when a host system intends to update data in the filled physical block, the data is first being written in another unfilled physical bock. In this case, the another unfilled physical block is stored with a valid data corresponding to data pending for being updated in the filled physical block, and the data pending for being updated in the filled physical block is then invalidated and retained in the filled physical block. When the host system continues to write data while all of the physical block are stored with the valid data and the invalid data at the same time (or when remaining physical blocks are less than a predetermined amount), a merging operation to these physical blocks is required. The merging operation refers to moving or copying the valid data on multiple physical blocks to one spare physical block, such that one physical block filled with the valid data and the invalid data can be erased so as to be used for storing other data. However, the merging operation for the valid data across multiple physical blocks may cost a lot of time, and the host system cannot wait for exceeding a predetermined time once a write command is issued. Accordingly, how to ensure that the host system does not wait for too long in any case has become one of the major subjects in the industry for person skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a writing method, a memory controller and a memory storage device using the same, which avoid the host system from waiting too long when writing data.

A writing method is provided according to an exemplary embodiment of the invention, and configured to control a rewritable non-volatile memory module. The rewritable non-volatile memory module includes a plurality of physical erasing units, each physical erasing unit includes a plurality of physical programming units and the physical erasing units are at least grouped into a storage area. The writing method includes steps of: configuring logical addresses to map to part of physical programming units in a storage area, wherein at least one of the physical programming units stores a valid data; transmitting a first write command, for writing a first data having a first data length to at least one of the physical programming units; receiving a status signal transmitted by the rewritable non-volatile memory module; and selecting a spare physical erasing unit and copying the valid data having a second data length to the spare physical erasing unit, after transmitting the first write command and before receiving the status signal, wherein the first data length is not greater than the second data length.

From another perspective, a memory storage device is provided according to an exemplary embodiment of the invention, and the memory storage device includes a connector, the rewritable non-volatile memory module as described above and a memory controller. The connector is configured to couple to a host system. The memory controller is coupled to the connector and the rewritable non-volatile memory module, and configured to configure a plurality of logical addresses to map to a part of the physical programming units in the storage area, and at least one of the physical programming units stores with at least one valid data. The memory controller is also configured to transmit a first write command for writing data having a first data length to at least one of the physical programming units. The memory controller is further configured to receive a status signal transmitted by the rewritable non-volatile memory module. In addition, the memory controller selects a spare physical erasing unit and spies the valid data having a second data length to the spare physical erasing unit, after transmitting the first write command and before receiving the status signal. The first data length is not greater than the second data length.

From another perspective, a memory controller is provided according to an exemplary embodiment of the invention, and the memory controller includes a host interface, a memory interface and a memory management circuit. The host interface is configured to couple to a host system. The memory interface is configured to couple to the rewritable non-volatile memory module as described above. The memory management circuit is coupled to the host interface and the memory interface, and configured to configure a plurality of logical addresses to map to a part of the physical programming units in the storage area, and at least one of the physical programming units stores with at least one valid data. The memory management circuit is also configured to transmit a first write command for writing data having a first data length to at least one of the physical programming units. The memory management circuit is further configured to receive a status signal transmitted by the rewritable non-volatile memory module. In addition, the memory management circuit selects a spare physical erasing unit and spies the valid data having a second data length to the spare physical erasing unit, after transmitting the first write command and before receiving the status signal. The first data length is not greater than the second data length.

Based on above, in the writing method, the memory controller and the memory storage device provided in the exemplary embodiments of the invention, since some valid data are copied each time a piece of data is written, it prevents the host system from waiting too long when executing a specific write command.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data to or read data from the memory storage device.

Figure 1A:
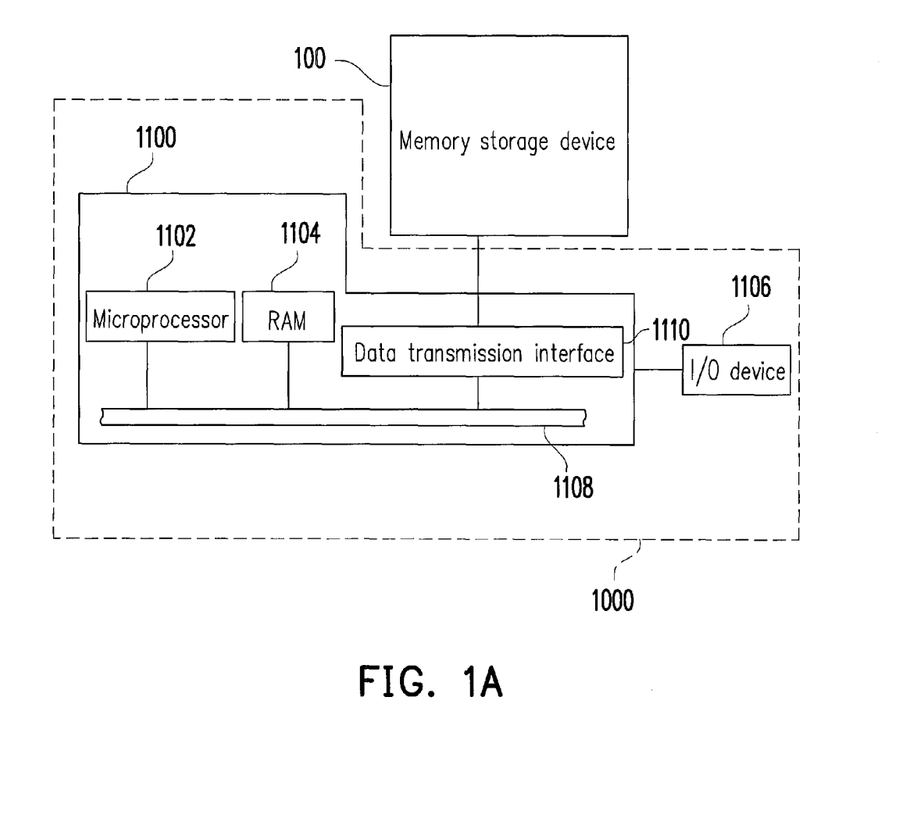
FIG. 1A is a schematic diagram illustrating a host system and a memory storage device according to an exemplary embodiment.

FIG. 1A illustrates a host system and a memory storage device according to an exemplary embodiment.

Figure 1B:
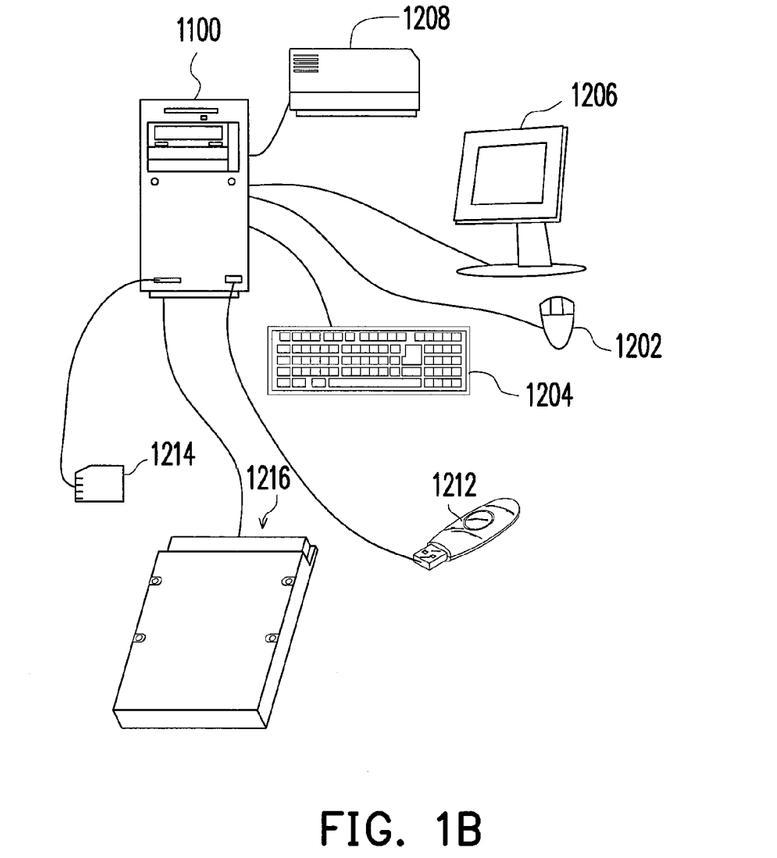
FIG. 1B is a schematic diagram illustrating a computer, an input/output device and a memory storage device according to an exemplary embodiment.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 1B. It should be understood that the devices illustrated in FIG. 1B are not intended to limit the I/O device 1106, and the I/O device 1106 may further include other devices.

In the embodiment of the invention, the memory storage device 100 is coupled to the devices of the host system 1000 through the data transmission interface 1110. By using the microprocessor 1102, the random access memory (RAM) 1104 and the Input/Output (I/O) device 1106, data may be written to the memory storage device 100 or may be read from the memory storage device 100. For example, the memory storage device 100 may be a rewritable non-volatile memory storage device such as a flash drive 1212, a memory card 1214, or a solid state drive (SSD) 1216 as shown in FIG. 1B.

Figure 1C:
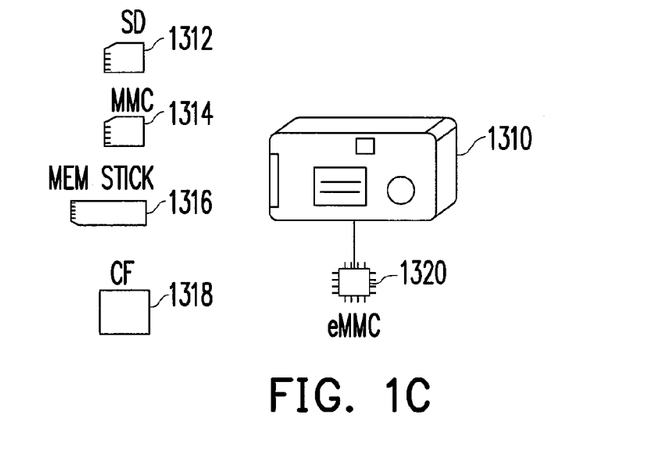
FIG. 1C is a schematic diagram of a host system and a memory storage device according to an exemplary embodiment.

Generally, the host system 1000 may substantially be any system capable of storing data with the memory storage device 100. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage device may be a SD card 1312, a MMC card 1314, a memory stick 1316, a CF card 1318 or an embedded storage apparatus 1320 (as shown in FIG. 1C). The embedded storage apparatus 1320 includes an embedded MMC (eMMC). It should be mentioned that the eMMC is directly coupled to a substrate of the host system.

Figure 2:
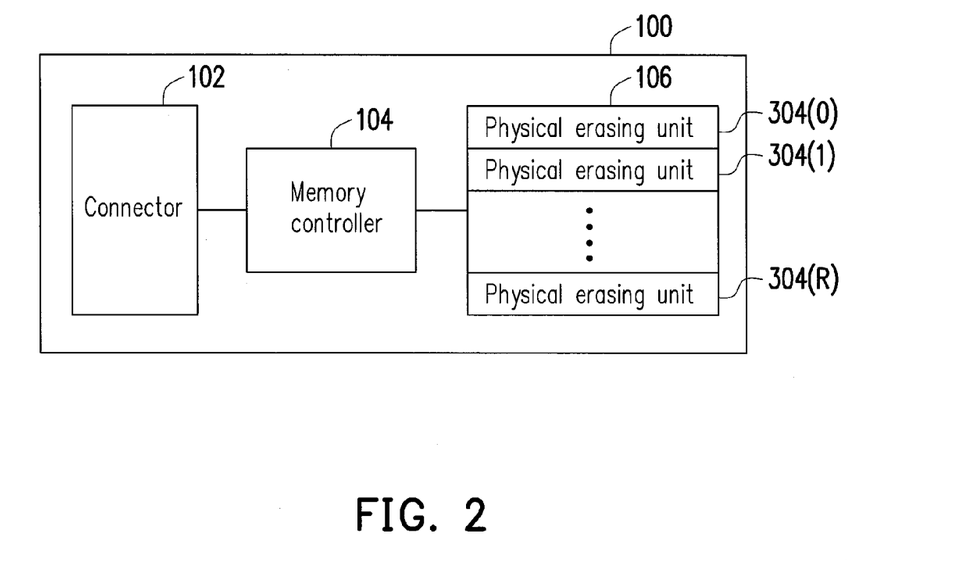
FIG. 2 is a schematic block diagram of the memory storage device depicted in FIG. 1A.

FIG. 2 is a schematic block diagram of the memory storage device depicted in FIG. 1A.

Referring to FIG. 2, the memory storage device 100 includes a connector 102, a memory controller 104 and a rewritable non-volatile memory storage module 106.

In the present exemplary embodiment, the connector 102 is compatible with a serial advanced technology attachment (SATA) standard. However, the invention is not limited thereto, and the connector 102 may also be compatible with a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards.

The memory controller 104 is configured to execute a plurality of logic gates or control commands which are implemented in a hardware form or in a firmware form, so as to perform operations of writing, reading or erasing data in the rewritable non-volatile memory storage module 106 according to the commands of the host 1000.

The rewritable non-volatile memory storage module 106 is coupled to the memory controller 104 and configured to store data written from the host system 1000. The rewritable non-volatile memory storage module 106 includes multiple physical erasing units 304(0) to 304(R). For example, the physical erasing units 304(0) to 304(R) may belong to the same memory die or belong to different memory dies. Each physical erasing unit has a plurality of physical programming units, and the physical programming units of the same physical erasing unit may be written separately and erased simultaneous. For example, each physical erasing unit is composed by 128 physical programming units. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundancy bit area. The data bit area having multiple physical access address is used to store user data, and the redundant bit area is used to store system data (for example, control information and error checking and correcting code). In the present exemplary embodiment, each data bit area of the physical programming unit contains 4 physical access addresses, and the size of each physical access address is 512-byte (B). However, in other exemplary embodiments, the data bit area may also include 8, 16, or more or less of the physical address, and amount and sizes of the physical access address are not limited in the invention. For example, the physical erasing unit is a physical block, and the physical programming unit is a physical page or a physical sector.

In the present exemplary embodiment, a rewritable non-volatile memory module 106 is a Multi Level Cell (MLC) NAND flash memory module which stores at least 2 bits of data in one cell. The rewritable non-volatile memory module 106 may also be a Single Level Cell (SLC) NAND flash memory module, a Trinary Level Cell (TLC) NAND flash memory module, other flash memory modules or any memory module having the same features.

Figure 3:
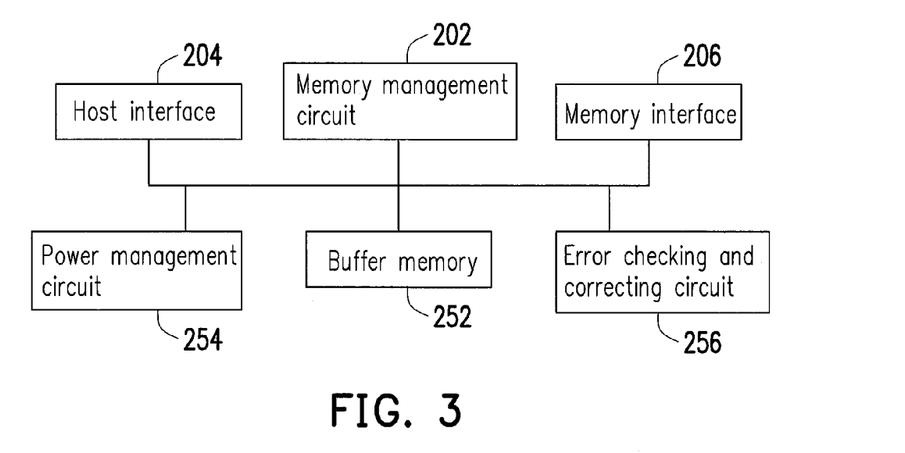
FIG. 3 is a schematic block diagram of a memory controller according to an exemplary embodiment.

FIG. 3 is a schematic block diagram of a memory controller according to an exemplary embodiment.

Referring to FIG. 3, the memory controller 104 includes a memory management circuit 202, a host interface 204 and a memory interface 206.

The memory management circuit 202 is configured to control the overall operations of the memory controller 104. Specifically, the memory management circuit 202 has a plurality of control commands. When the memory storage device 100 is operated, the control commands are executed to perform various operations such as data writing, data reading and data erasing. Operations of the memory management circuit 202 are similar to the operations of the memory management circuit 104, thus related description is omitted hereinafter.

In the present exemplary embodiment, the control commands of the memory management circuit 202 are implemented in a form of a firmware. For example, the memory management circuit 202 has a microprocessor unit (not illustrated) and a ROM (not illustrated), and the control commands are burned into the ROM. When the memory storage device 100 is operated, the control commands are executed by the microprocessor to perform operations of writing, reading or erasing data.

In another exemplary embodiment of the invention, the control commands of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 106 to the RAM of the memory management circuit 202 when the memory controller 104 is enabled. Next, the control commands are executed by the microprocessor unit to perform operations of writing, reading or erasing data.

Further, in another exemplary embodiment of the invention, the control commands of the memory management circuit 202 may also be implemented in a form of hardware. For example, the memory management circuit 220 includes a microcontroller, a memory writing unit, a memory reading unit, a memory erasing unit and a data processing unit. The memory management unit, the memory writing unit, the memory reading unit, the memory erasing unit and the data processing unit are coupled to the microprocessor. The memory management unit is configured to manage the physical erasing units of the rewritable non-volatile memory module 106; the memory writing unit is configured to issue a write command to the rewritable non-volatile memory module 106 in order to write data to the rewritable non-volatile memory module; the memory reading unit is configured to issue a read command to the rewritable non-volatile memory module 106 in order to read data from the rewritable non-volatile memory module 106; the memory erasing unit is configured to issue an erase command to the rewritable non-volatile memory module 106 in order to erase data from the rewritable non-volatile memory module 106; the data processing unit is configured to process both the data to be written to the rewritable non-volatile memory module 106 and the data to be read from the rewritable non-volatile memory module 106.

The host interface 204 is coupled to the memory management circuit 202 and configured to receive and identify commands and data sent from the host system 1000. Namely, the commands and data sent from the host system 1000 are passed to the memory management circuit 202 through the host interface 204. In the present exemplary embodiment, the host interface 204 is compatible to a SATA standard. However, it should be understood that the present invention is not limited thereto, and the host interface 204 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

In an exemplary embodiment of the invention, the memory controller 104 further includes a buffer memory 252, a power management circuit 254 and an error checking and correcting circuit 256.

The buffer memory 252 is coupled to the memory management circuit 202 and configured to temporarily store data and commands from the host system 1000 or data from the rewritable non-volatile memory module 106.

The power management unit 254 is coupled to the memory management circuit 202 and configured to control the power of the memory storage device 100.

The error checking and correcting circuit 256 is coupled to the memory management circuit 202 and configured to perform an error checking and correcting process to ensure the correctness of data. Specifically, when the memory management circuit 202 receives a write command from the host system 1000, the error checking and correcting circuit 256 generates an error checking and correcting code (ECC code) for data corresponding to the write command, and the memory management circuit 202 writes data and the ECC code corresponding to the write command to the rewritable non-volatile memory module 106. Next, when reading data from the rewritable non-volatile memory module 106, the memory management circuit 202 also reads the ECC Code corresponding to such data, and the error checking and correcting circuit 256 performs an error checking and correcting process on the read data based on the read ECC code.

Figure 4:
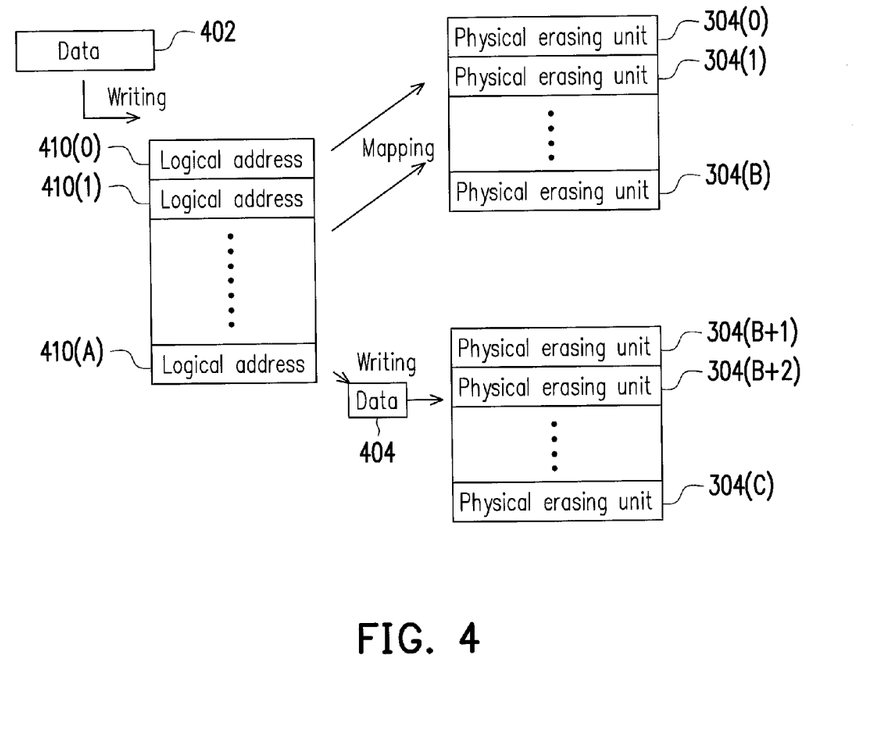
FIG. 4 is a schematic diagram illustrating an example for managing a memory storage device according to an exemplary embodiment.

FIG. 4 is a schematic diagram illustrating an example for managing a memory storage device according to an exemplary embodiment.

It should be understood that terms, such as "select", "relate", "group" and so forth, are logical concepts which describe operations in the physical erasing units of the rewritable non-volatile memory module 106. That is, the physical erasing units of the rewritable non-volatile memory module are logically operated, but actual positions of the physical units of the rewritable non-volatile memory module are not changed.

Referring to FIG. 4, generally, the memory management circuit 202 at least groups physical erasing units 304(0) to 304(R) into a storage area and a system area. The physical erasing units in the storage area may be configured to store user data from the host system 1000, to replace damaged physical erasing units, or to be served as a buffer area when writing data. The physical erasing units of the system area are configured to store system information including information related to manufacturer and model of a memory chip, a number of physical erasing units in the memory chip, a number of the physical programming unit in each physical erasing unit, and so forth. Herein, the physical erasing units 304(0) to 304(C) belong to the physical erasing units in the storage area. In other exemplary embodiments, the memory management circuit 202 may also group the physical erasing units 304(0) to 304(R) into other areas, but the invention is not limited thereto. For instance, the memory management circuit 202 may further group the physical erasing units 304(0) to 304(R) into a replacement area in which the physical erasing units are configured to replace the damaged physical units. In the present exemplary embodiment, the physical erasing units in the replacement area and the storage area are used together.

The memory controller 104 configures logical addresses 410(0) to 410(A) for facilitating in data access to the physical erasing units stored with the data. For instance, when the memory storage device 100 is formatted by an operating system on the host system 1000 (e.g., FAT 32), the logical addresses 410(0) to 410(A) are respectively mapped to the physical programming units in the physical erasing unit 304(0) to 304(B). Herein, the memory management circuit 202 establishes a logical address-physical programming unit mapping table to record a mapping relation between the logical addresses and the physical programming units. In the present exemplary embodiment, a size of each of the logical addresses 410(0) to 410(A) is identical to a size of each of the physical programming units. However, in other exemplary embodiments, each of the logical addresses 410(0) to 410(A) may also be a size of the physical erasing unit or other sizes, the invention is not limited thereto. After the memory storage device 100 is formatted, the physical erasing units 304(B+1) to 304(C) are neither mapped to the logical addresses 410(0) to 410(A) nor stored with the valid data. Herein, the physical erasing unit that is neither mapped to the logical addresses 410(0) to 410(A) nor stored with the valid data in the storage area (i.e., the physical erasing units 304(B+1)~304(C)) is referred as a spare physical erasing unit.

When the host system 1000 intended to write a data 402 to the memory storage device 100, the host system 1000 issues a write command that instructs the data 402 to be written to at least one of the logical addresses 410(0) to 410(A). It is assumed herein that the data 402 is to be written to the logical addresses 410(0) to 410(1), and the logical addresses 410(0) to 410(1) are mapped to two physical programming units in the physical erasing unit 304(0). The memory management circuit 202 obtains a data 404 from the data 402, and it is assumed herein that the data 404 belongs to the logical address 410(0). The memory management circuit 202 also selects one physical erasing unit (e.g., the physical erasing unit 304(B+2)) from among the physical erasing units 304(B+1) to 304(C), writes the data 404 to the physical erasing unit 340(B+2) and re-maps the logical address 410(0) to the physical erasing unit being written. Similarly, the memory management circuit 202 also writes data that belongs to the logical address 410(1) to the physical erasing unit 304(B+2). Accordingly, the physical programming unit originally mapped to the logical addresses 410(0) to 410(1) in the physical erasing unit 304(0) is now stored with the invalid data while the physical erasing unit 304(B+2) is stored with the valid data. If there are other valid data stored in the physical erasing unit 304(0), the physical erasing unit 304(0) is then stored with the valid data and the invalid data at the same. When the host system 1000 continues to write data to the memory storage device 100, as a number of the physical erasing units stored with the invalid data and the valid data at the same time increases, a number of the spare physical erasing units will decrease. Therefore, the memory management circuit 202 merges the valid data so as to increase one spare physical erasing unit.

Figure 5:
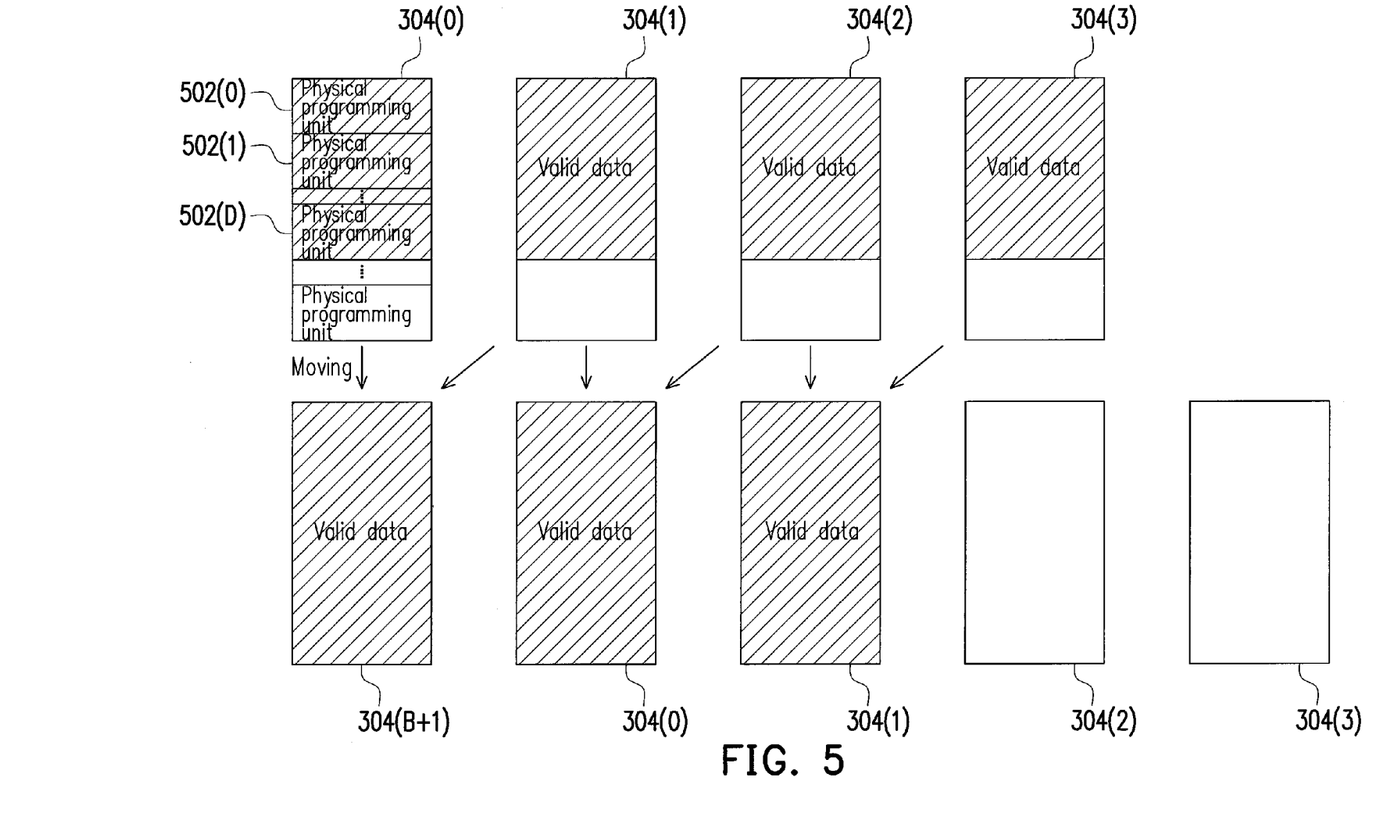
FIG. 5 is a schematic diagram illustrating an example for copying a valid data according to an exemplary embodiment.

FIG. 5 is a schematic diagram illustrating an example for copying a valid data according to an exemplary embodiment.

Referring to FIG. 5, it is assumed herein that the physical erasing units 304(0) to 304(3) are stored with the valid data and the invalid data. For instance, the physical programming units 502(0) to 502(D) in the physical erasing unit 304(0) are stored with the valid data while the rest of the physical programming units are stored with the invalid data. Similarly, the physical erasing units 304(1) to 304(3) also include the physical programming units that stored with the valid data. Before the valid data are merged, the physical erasing unit 304(B+1) belongs to the spare physical erasing unit. Accordingly, the memory management circuit 202 copies the valid data in the physical erasing unit 304(0) to the physical erasing unit 304(B+1). It should be noted that, the physical erasing unit 304(0) may not be stored with any valid data after the valid data in the physical erasing unit 304(0) are copied, such that the memory management circuit 202 may erase the physical erasing unit 304(0) and treat the physical erasing unit 304(0) as a spare physical erasing unit. Next, the valid data in the physical erasing unit 304(1) is copied to the physical erasing unit 304(0), so that the physical erasing unit 304(1) also becomes another spare physical erasing unit. As the rest may be deduced by analogy, the valid data of the physical erasing unit 304(2) is copied to the physical erasing units 304(0) and 304(1), and the valid data of the physical erasing unit 304(3) is copied to the physical erasing units 304(1). Afterwards, the physical erasing units 304(2) and 304(3) are both erased to become the spare physical erasing unit. Accordingly, the number of the spare physical erasing units is increased by 1.

In the exemplary embodiment according to FIG. 5, the valid data in 4 physical erasing units 304(0) to 304(3) are copied. Nevertheless, if the valid data in the physical erasing units 304(0) to 304(3) can be reduced, the valid data to be copied can also be reduced. For instance, in case when only a half of the physical programming units in the physical erasing units 304(0) and 304(1) are stored with the valid data, the memory management circuit 202 may simply merge the valid data in the physical erasing units 304(0) and 304(1) to increase one spare physical erasing unit. In a worst case scenario, each of the physical erasing units to be merged is stored with the same number of the valid data, and a proportion of the valid data is related to a volume of the logical addresses 410(0) to 410(A) and a volume of the physical erasing units 304(0) to 304(C). More specifically, if the volume of the logical addresses 410(0) to 410(A) is 1.5 G (Gigabyte), and the volume of the physical erasing units in the storage area is 2 G, in the worst case scenario, ¾ of the physical programming units in each of the physical erasing units to be merged may be stored with the valid data. Generally, when the write command from the host system 100 is executed, the memory management circuit 202 may show a status of the rewritable non-volatile memory module 106 as a busy status. For instance, the memory management circuit 202 may enable (or disable) a pin on the connector 102 so as to show the busy status. The memory management circuit 202 is required to show the status of the rewritable non-volatile memory module 106 as a non-busy status within a preset time, so as to indicate that it is available for receiving the next write command. Therefore, it may exceed the preset time if the valid data to be merged are too much. In the present exemplary embodiment, the memory management circuit 202 copies a part of the valid data once a piece of data is written, so as to avoid a circumstance that a time spent for copying the valid data exceeds said preset time as in the worst case scenario.

Figure 6:
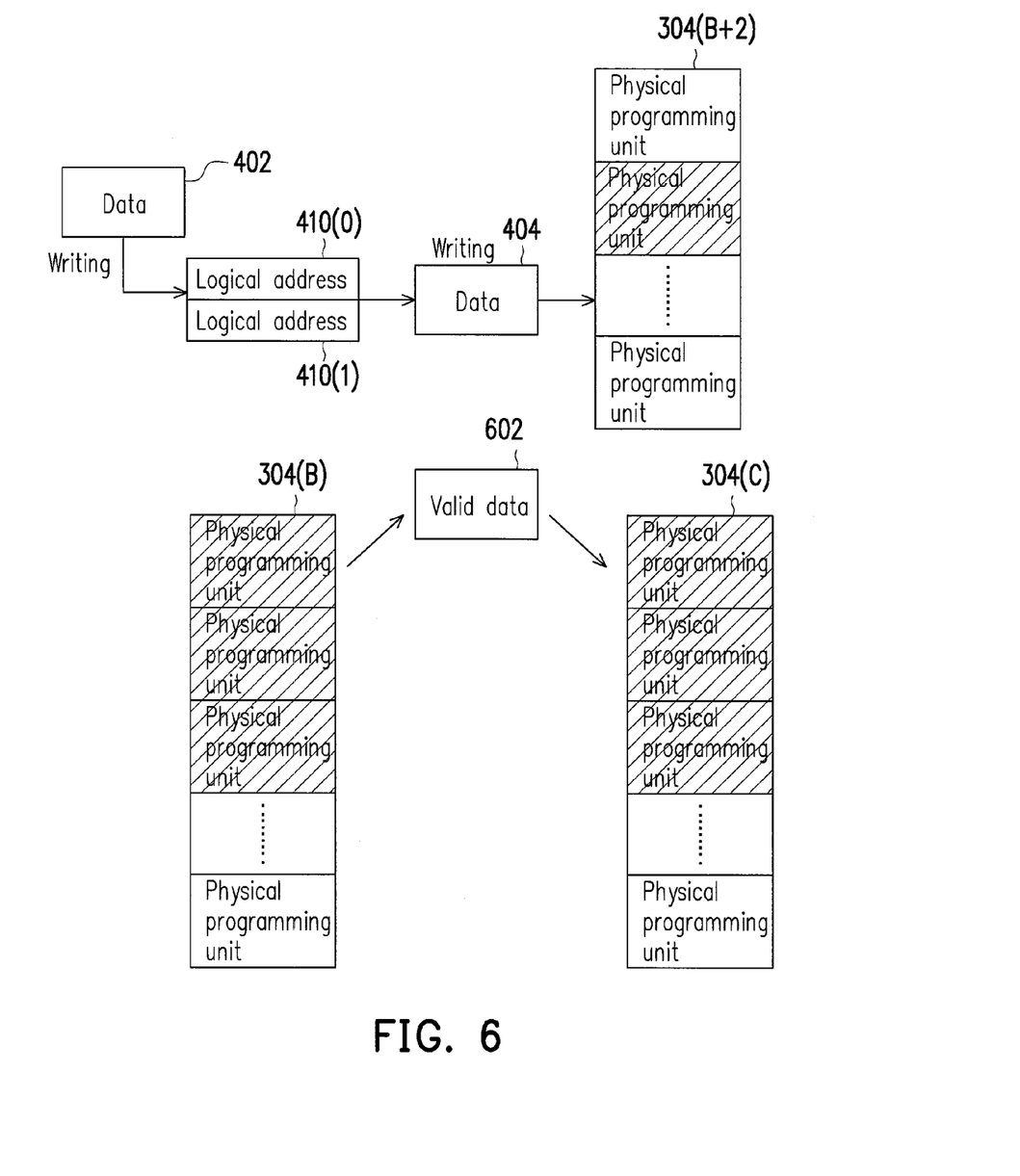
FIG. 6 is a schematic diagram illustrating an operation of copying a valid data distributively across multiple write commands according to an exemplary embodiment.

FIG. 6 is a schematic diagram illustrating an operation of copying a valid data when writing data according to an exemplary embodiment.

Referring to FIG. 6, after the memory management circuit 202 receives one write command (corresponding to the data 402) from the host system, a first write command is transmitted to the rewritable non-volatile memory module 106 for writing the data 404 (also known as a first data) to at least one physical programming unit, in which the first data 404 has a first data length. For instance, the data 404 may be written to one physical programming unit in the physical erasing unit 304(B+2), however, the invention does not intend to limit the physical erase unit to which the data is written. In particular, the memory management circuit 202 may also determine whether a status of the storage area meets a preset condition. If the status of the storage area meets the preset condition, after the first write command is transmitted and before a status signal transmitted by the rewritable non-volatile memory module 106 is received, the memory management circuit 202 copies a valid data 602 having a second data length to one spare physical erasing unit. Among which, the status signal is configured to indicate whether the data 404 is successfully written by the rewritable non-volatile memory module 106, and the first data length is not longer than the second data length. For instance, when writing the data 404, the memory management circuit 202 may also copy the valid data in 3 physical programming units (i.e., the 3 physical erasing units having the second data length as depicted in FIG. 6) in the physical erasing unit 304(B) to the physical erasing unit 304(C), however, the invention is not limited to how long the second data length is. It should be noted that, in other exemplary embodiments, the data 402 and 404 and the valid data 602 may have other data lengths, the invention is not limited thereto.

In a writing processes of the data 402 and copying the valid data 602, the memory management circuit 202 shows the status of the rewritable non-volatile memory module 106 as the busy status. After the processes of writing the data 404 and copying the valid data 602 are completed, the memory management circuit 202 shows the status of the rewritable non-volatile memory module 106 as the non-busy status.

Figure 7:
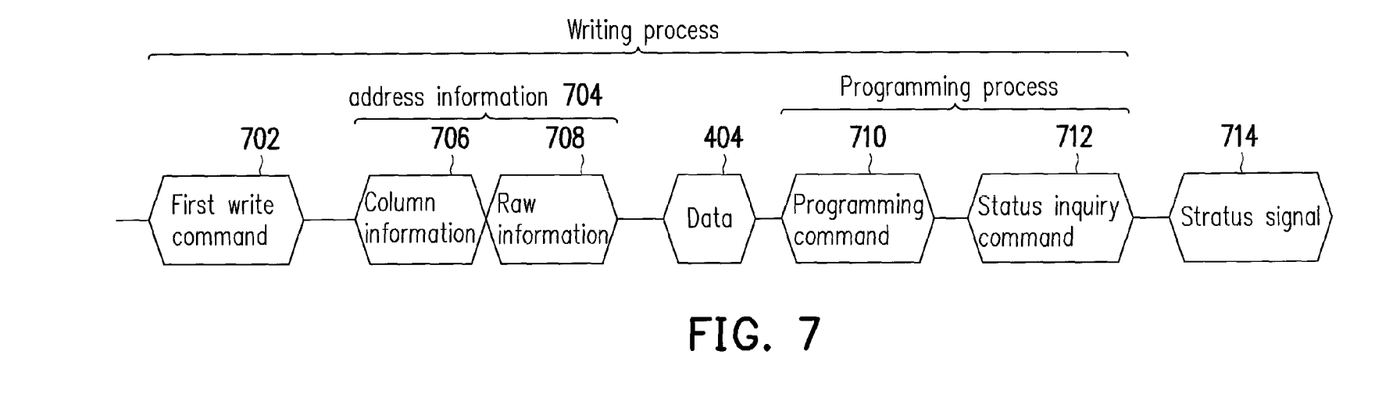
FIG. 7 is a schematic diagram illustrating a signal transmitted between a memory controller 104 and a rewritable non-volatile memory module 106 according to an exemplary embodiment.

FIG. 7 is a schematic diagram illustrating a signal transmitted between a memory controller 104 and a rewritable non-volatile memory module 106 according to an exemplary embodiment.

Referring to FIG. 6 and FIG. 7, more specifically, when the memory management circuit 202 intends to write the data 404 to the rewritable non-volatile memory module 106, a first write command 702 is first transmitted to the rewritable non-volatile memory module 106. Next, the memory management circuit 202 transmits at least one address information 704, and the address information 704 at least includes a row information 706 and a column information 708. The row information 706 and the column information 708 are physical addresses indicating the address where the data 404 is to be written. After the address information 704 is transmitted, the memory management circuit 202 transmits the data 404 to one buffer memory (not illustrated) in the rewritable non-volatile memory module 106. Next, the memory management circuit 202 transmits a programming command 710. After the programming command 710 is received, the rewritable non-volatile memory module 160 programs the data 404 in the buffer memory to a corresponding physical programming unit according to the address information 704 (a programming process). The memory management circuit 202 also transmits a status inquiry command 712 configured to request the rewritable non-volatile memory module 106 to reply a status signal 714. The status signal 714 is configured to indicate whether the data 404 is successfully written to the physical programming unit corresponding to the address information 704. Herein, a process from transmitting the first write command 702 to transmitting the status inquiry command 712 is also known as the writing process, whereas during the programming process, the status of the rewritable non-volatile memory module 106 is shown as the busy status. In the present exemplary embodiment, after the programming command 710 is transmitted and before the status signal 714 is received, the memory management circuit 202 copies the valid data 602 to one spare physical erasing unit. In other words, since the data 404 is to be written and the valid data is to be copied, a time spent by the programming process may be extended. Nevertheless, in another exemplary embodiment, the step of copying the valid data 602 may also be executed after the first write command 702 is transmitted and before the programming command 710 is transmitted, the invention is not limited thereto.

Referring back to FIG. 6, in an exemplary embodiment, if a number of the spare physical erasing units in the storage area is less than a preset number, the memory management circuit 202 may determine whether the status of the storage area meets above-said preset condition. The preset number may be, for example, 2, of course, the invention is not limited to this preset number to which. In other word, when the number of the spare physical erasing units is smaller than the preset number, the memory management circuit 202 may start to merge the valid data so as to increase the number of the spare physical erasing units. In another exemplary embodiment, the memory management circuit 202 may also set above-said preset condition to other conditions, the invention is not intended to limit the preset condition. On the other hand, if the status of the storage area does not meet the preset condition, after the memory management circuit 202 writes the data 402 to the rewritable non-volatile memory module 106, the status of the rewritable non-volatile memory module 106 is shown as the non-busy status.

In an exemplary embodiment, the memory management circuit 202 decides the data length (i.e., the second data length) of the valid data 602 according to a data length (also know as a third data length) of the data 402 (also known as a third data), the volume of the logical addresses 410(0) to 410(A) and the volume of the physical erasing units 304(0) to 304(C) in the storage area. Namely, as the third data length gets longer, the second data length is getting longer. For instance, the second data length is a product of the data length of the data 404 multiplied by a multiplier, and the multiplier is generated according to the volume of the logical addresses 410(0) to 410(A) and the volume of the physical erasing units 304(0) to 304(C) in the storage area. More specifically, it is assumed that the volume of the logical addresses 410(0) to 410(A) is 1.5 G, and the volume of the physical erasing units in the storage area is 2 G, thus in the worst case scenario, ¾ of the physical programming units in each of the physical erasing units to be merged may be stored with the valid data. Accordingly, the memory management circuit 202 is at least required to copy the valid data in 4 (1/(1−¾)=4) physical erasing units in order to generate one spare physical erasing unit, and the valid data being copied may be stored in 3 (4−1=3) physical erasing units. Therefore, if the valid data in 3 physical programming units are copied each time the memory management circuit 202 writes the data 404 to one physical programming unit, the memory management circuit 202 may complete copying of the valid data in 4 physical erasing units after one physical erasing unit is filled. In detail, the multiplier is a quotient of the volume of the logical addresses divided by a value, and the value is a difference of the volume of the physical erasing units minus the volume of the logical addresses 410(0) to 410(A). According to above exemplary embodiment, the multiplier may be written as an expression of (3/(4−3)=3). Accordingly, the valid data in 3 physical erasing units is copied when writing the data 404, and after writing the data 402 corresponding to the logical address 410(1), the valid data in another 3 physical erasing units is copied. However, according to another exemplary embodiment, said multiplier may also be other values. For instance, if a proportion of the volume of the logical addresses 410(0) to 410(A) and the volume of the physical erasing units in the storage area being 50:51, the multiplier is 50/(51−50)=50, accordingly.

In FIG. 6, the data length of the data 404 is a length of single one of the physical programming units, and the data length of the valid data 602 is a length of multiple ones of the physical programming units. In other words, the memory management circuit 202 utilizes the physical programming unit as a minimum unit for copying. Alternatively, in another exemplary embodiment, the memory management circuit 202 decides the data length of the valid data 602 according to a part of the data 404 being programmed. For example, when the size of one physical programming unit is 4 KB, the memory management 202 may program 512 Byte of data to one physical programming unit each time. In case when the part of the data 404 being programmed has a fourth data length, the memory management circuit 202 may multiply the fourth data length by 3 so as to become the data length of the valid data 602.

After the status of the rewritable non-volatile memory module 106 is shown by the memory management circuit 202 as the non-busy status, the host system 100 may issue another write command to the memory management circuit 202. In this case, the status of the rewritable non-volatile memory module 106 is shown again by the memory management circuit 202 as the busy status. Similarly, the memory management circuit 202 may also copy some valid data when writing data. For instance, it is assumed that the memory management circuit 202 has already copied the part of the valid data in the physical erasing unit 304(B) to the physical erasing unit 304(C) when executing the previous write command. In this case, when executing the next write command, the memory management circuit 202 may copy other valid data in the physical erasing unit 304(B) to the physical erasing unit 304(C). When the valid data in the physical erasing unit 304(B) are copied, the memory management circuit 202 may then erase the physical erasing unit 304(B). In other words, all of the valid data in the physical erasing unit 304(B) are copied to the physical erasing unit 304(C). Lastly, the status of the rewritable non-volatile memory module 106 is shown again by the memory management circuit 202 as the non-busy status.

In the present exemplary embodiment, the valid data being copied are stored to the same physical erasing unit 304(B). However, in another exemplary embodiment, the valid data being copied may be distributively stored across multiple physical erasing units. The physical erasing unit to which the valid data is obtained from when copying the valid data is not particularly limited by the invention.

Figure 8:
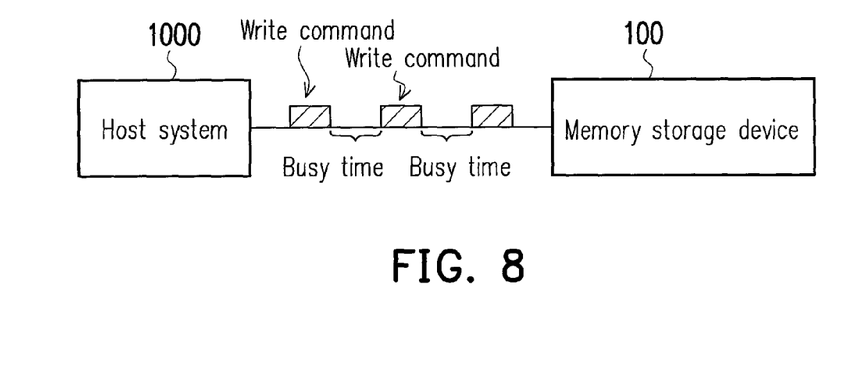
FIG. 8 is a schematic diagram illustrating an operation of copying a valid data distributively across multiple write commands according to an exemplary embodiment.

FIG. 8 is a schematic diagram illustrating an operation of copying a valid data distributively across multiple write commands according to an exemplary embodiment.

Referring to FIG. 8, above-said programming process may generate a busy time. During the busy time, the host system 1000 cannot transmit other write commands to the memory management circuit 202. Based on the above method, the memory management circuit 202 distributes the busy time caused by copying the valid data across different write commands. Accordingly, the busy time after one write command will not take too long. Also, even in the worst case scenario, the memory management circuit 202 may also manage to increase one spare physical erasing unit after one physical erasing unit is filled.

Figure 9:
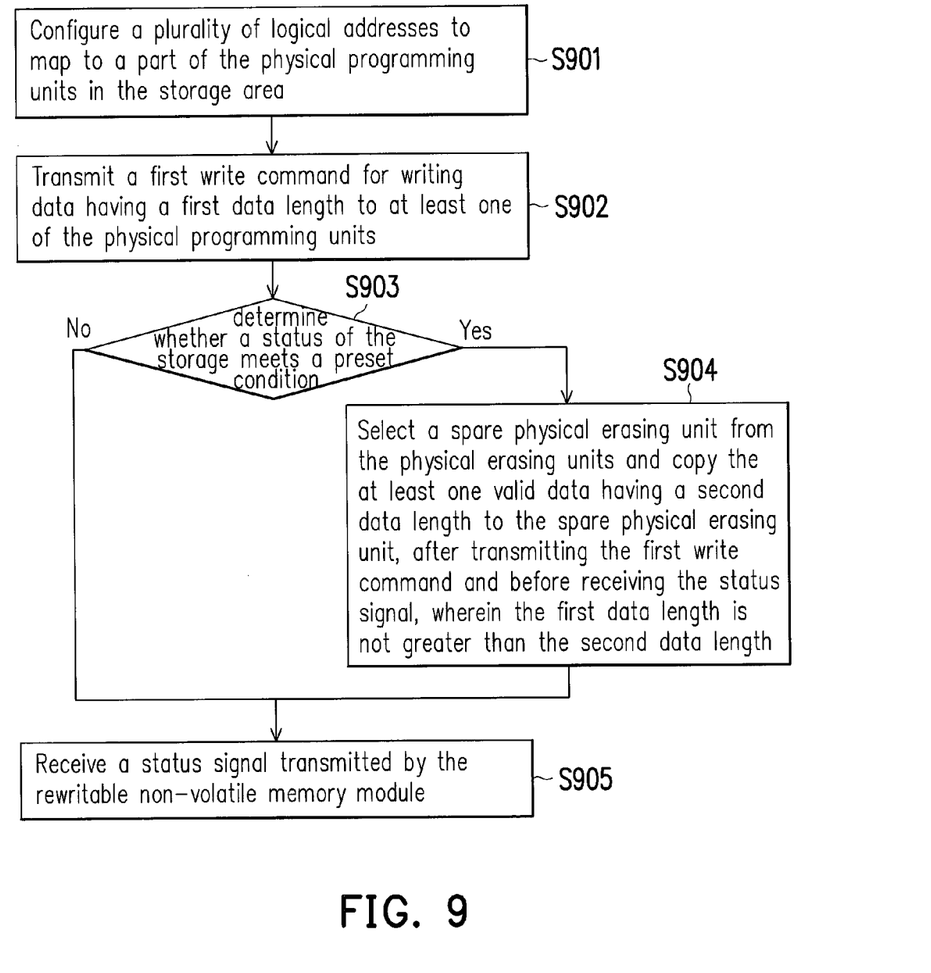
FIG. 9 is a flowchart of a data writing method according to an exemplary embodiment.

FIG. 9 is a flowchart of a data writing method according to an exemplary embodiment.

Referring to FIG. 9, in step S901, a plurality of logical addresses are configured to map to a part of the physical programming units in the storage area. In step S902, a first write command is transmitted for writing data having a first data length to at least one of the physical programming units. In step S903, it is determined whether a status of the storage meets a preset condition. If the status of the storage area meets the preset condition, in step S904, a spare physical erasing unit is selected from the physical erasing units and the at least one valid data having a second data length is copied to the spare physical erasing unit, after transmitting the first write command and before receiving the status signal, wherein the first data length is not greater than the second data length. In step S905, a status signal transmitted by the rewritable non-volatile memory module is received.

Steps depicted in FIG. 9 are described in detail as above, thus it is omitted hereinafter. It should be noted that, the steps depicted in FIG. 9 may be implemented as a plurality of program codes or circuits. Moreover, the method disclosed in FIG. 9 may be implemented with reference to above embodiments, or may be implement separately, the invention is not limited thereto.

In view of above, as proposed in the exemplary embodiments of the invention, the writing method, the memory controller and the memory management circuit are capable of distributing time required for copying the valid data across multiple write commands. In addition, even when the worst case scenario occurs, one spare physical erasing unit may still be additionally generated after one physical erasing unit is filled.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A writing method for controlling a rewritable non-volatile memory module, wherein the rewritable non-volatile memory module comprises a plurality of physical blocks, each of the physical blocks comprises the same number of a plurality of physical pages, and the physical blocks are at least grouped into a storage area, wherein each of the physical block is the minimum unit for erasing, and the data storing method comprises:
   configuring a plurality of logical addresses to map to a part of the physical pages in the storage area, wherein at least one of the physical pages stores at least one valid data, wherein a plurality of spare physical blocks among the physical blocks in the storage area are not mapped to the logical addresses;
   transmitting a first write command to the rewritable non-volatile memory module, for writing a first data having a first data length to at least one first physical page of a first spare physical block among the spare physical blocks;
   receiving a status signal transmitted by the rewritable non-volatile memory module;
   selecting a second spare physical block from the spare physical blocks and copying the at least one valid data having a second data length to at least one second physical page of the second spare physical block, after transmitting the first write command and before receiving the status signal, wherein the second spare physical block is different from the first spare physical block; and
   deciding the second data length according to the first data length, a volume of all the logical addresses and a volume of all the spare physical blocks in the storage area,
   wherein the second data length is not less than the first data length.

2. The writing method of claim 1, wherein after transmitting the first write command and before receiving the status signal, the method further comprises:
   transmitting at least one address information to the rewritable non-volatile memory module, wherein the address information represents an address where the first data is predetermined to be written;
   delivering the first data to a buffer memory of the rewritable non-volatile memory module;
   transmitting a programming command for programming the first data temporarily stored in the buffer memory to the first spare physical block; and
   transmitting a status inquiry command to the rewritable non-volatile memory module to request the rewritable non-volatile memory module to reply the status signal;
   wherein, the at least one valid data having the second data length is copied to the second spare physical block, after transmitting the first write command and before receiving the status signal.

3. The writing method of claim 1, further comprising:
   receiving a third data having a third data length from a host system; and
   deciding the second data length according to the third data length.

4. The writing method of claim 3, wherein the second data length is a product of the first data length multiplied by a multiplier, and the multiplier is generated according to the volume of all the logical addresses and the volume of all the spare physical blocks in the storage area.

5. The writing method of claim 4, wherein the multiplier is a quotient of the volume of all the logical addresses divided by a value, and the value is the volume of all the spare physical blocks in the storage area.

6. The writing method of claim 1, wherein the first data length is a length of single one of the physical pages, and the second data length is a length of multiple ones of the physical pages.

7. The writing method of claim 1, wherein when writing the first data, the writing method further comprises:
   programming at least a part of the first data according to the first write command, wherein the at least a part of the first data being programmed has a fourth data length; and
   deciding the second data length according to the fourth data length.

8. The writing method of claim 1, wherein before writing the first data, the writing method further comprises:
   determining whether a number of the spare physical blocks is less than a preset number; and copying the at least one valid data having the second data length to the second spare physical block when writing the first data if the number of the spare physical blocks is less than the preset number.

9. The writing method of claim 1, wherein the at least one valid data being copied is distributively stored across different ones of the physical blocks.

10. The writing method of claim 1, further comprising:
showing a status of the rewritable non-volatile memory module as a busy status, after transmitting the first write command and before receiving the status signal;
erasing at least one of the physical blocks, wherein the at least one valid data stored in the erased physical block are all copied to at least one of the spare physical block; and
showing the status of the rewritable non-volatile memory module as a non-busy status after receiving the status signal.

11. A memory storage device, comprising:
a connector, configured to couple to a host system;
a rewritable non-volatile memory module, comprising a plurality of physical blocks, wherein each of the physical blocks comprises the same number of a plurality of physical pages, and the physical blocks are at least grouped into a storage area, wherein each of the physical block is the minimum unit for erasing; and
a memory controller, coupled to the connector and the rewritable non-volatile memory module, and configured to configure a plurality of logical addresses to map to a part of the physical pages in the storage area, wherein at least one of the physical pages stores at least one valid data, wherein a plurality of spare physical blocks among the physical blocks in the storage area are not mapped to the logical addresses,
wherein the memory controller is configured to transmit a first write command to the rewritable non-volatile memory module, for writing a first data having a first data length to at least one first physical page of a first spare physical block among the spare physical blocks,
wherein the memory controller is configured to receive a status signal transmitted by the rewritable non-volatile memory module,
wherein the memory controller is configured to select a second spare physical block from the spare physical blocks and copy the at least one valid data having a second data length to at least one second physical page of the second spare physical block, after transmitting the first write command and before receiving the status signal, wherein the second spare physical block is different from the first spare physical block, and configured to decide the second data length according to the first data length, a volume of all the logical addresses and a volume of all the spare physical blocks in the storage area, wherein the second data length is not less than the first data length.

12. The memory storage device of claim 11, wherein after transmitting the first write command and before receiving the status signal, the memory controller is further configured to perform operations of:
transmitting at least one address information to the rewritable non-volatile memory module, wherein the address information represents an address where the first data is predetermined to be written;
delivering the first data to a buffer memory of the rewritable non-volatile memory module;
transmitting a programming command for programming the first data temporarily stored in the buffer memory to the first spare physical block; and
transmitting a status inquiry command to the rewritable non-volatile memory module to request that the rewritable non-volatile memory module to reply the status signal,
wherein, the memory controller copies the at least one valid data having the second data length to the second spare physical block, after transmitting the first write command and before receiving the status signal.

13. The memory storage device of claim 11, wherein the memory controller is further configured to receive a third data having a third data length from the host system, and the memory controller is configured to decide the second data length according to the third data length.

14. The memory storage device of claim 13, wherein the second data length is a product of the first data length multiplied by a multiplier, and the multiplier is generated according to the volume of all the logical addresses and the volume of all the spare physical blocks in the storage area.

15. The memory storage device of claim 14, wherein the multiplier is a quotient of the volume of all the logical addresses divided by a value, and the value is the volume of all the spare physical blocks in the storage area.

16. The memory storage device of claim 11, wherein the first data length is a length of single one of the physical pages, and the second data length is a length of multiple ones of the physical pages.

17. The memory storage device of claim 11, wherein when the memory controller writes the first data, the memory controller is further configured to program at least a part of the first data according to the first write command, wherein the at least a part of the first data being programmed has a fourth data length, and the memory controller is configured to decide the second data length according to the fourth data length.

18. The memory storage device of claim 11, wherein before the memory controller writes the first data, the memory controller is further configured to determine whether a number of the spare physical blocks is smaller than a preset number,
and the memory controller copies the at least one valid data having the second data length to the second spare physical block when writing the first data if the number of the spare physical blocks is less than the preset number.

19. The memory storage device of claim 11, wherein the at least one valid data being copied is distributively stored across different ones of the physical blocks.

20. The memory storage device of claim 11, wherein the memory controller is further configured to show a status of the rewritable non-volatile memory module as a busy status when writing the first data and copying the at least one valid data,
and the memory controller is further configured to erase at least one of the physical blocks, wherein the at least one valid data stored in the erased physical block are all copied to at least one of the spare physical block,
and the memory controller is further configured to show the status of the rewritable non-volatile memory module as a non-busy status after writing the first data and copying the at least one valid data.

21. A memory controller for controlling a rewritable non-volatile memory module, wherein the rewritable non-volatile memory module comprises a plurality of physical blocks, each of the physical blocks comprises the same number of a plurality of physical pages, the physical blocks are at least grouped into a storage area, wherein each of the physical block is the minimum unit for erasing, and the memory controller comprises:

a host interface, configured to couple to a host system;

a memory interface, configured to couple to the rewritable non-volatile memory module; and a memory management circuit, coupled to the host interface and the memory interface, and configured to configure a plurality of logical addresses to map to a part of the physical pages in the storage area, wherein at least one of the physical pages stores at least one valid data, wherein a plurality of spare physical blocks among the physical blocks in the storage area are not mapped to the logical addresses, wherein the memory management circuit is configured to transmit a first write command to the rewritable non-volatile memory module, for writing a first data having a first data length to at least one first physical page of a first spare physical block among the spare physical blocks, wherein the memory management circuit is configured to receive a status signal transmitted by the rewritable non-volatile memory module, wherein the memory management circuit is configured to select a second spare physical block from the spare physical blocks and copy the at least one valid data having a second data length to at least one second physical page of the second spare physical block, after transmitting the first write command and before receiving the status signal, wherein the second spare physical block is different from the first spare physical block, and configured to decide the second data length according to the first data length, a volume of all the logical addresses and a volume of all the spare physical blocks in the storage area, wherein the second data length is not less than the first data length.

22. The memory controller of claim 21, wherein after transmitting the first write command and before receiving the status signal, the memory management circuit is further configured to perform operations of:

transmitting at least one address information to the rewritable non-volatile memory module, wherein the address information represents an address where the first data is predetermined to be written;

delivering the first data to a buffer memory of the rewritable non-volatile memory module;

transmitting a programming command for programming the first data temporarily stored in the buffer memory to the first spare physical block; and transmitting a status inquiry command to the rewritable non-volatile memory module to request that the rewritable non-volatile memory module to reply the status signal, wherein, the memory management circuit copies the at least one valid data having the second data length to the second spare physical block, after transmitting the first write command and before receiving the status signal.

23. The memory controller of claim 21, wherein the memory management circuit is further configured to receive a third data having a third data length from a host system, and the memory management circuit is configured to decide the second data length according to the third data length.

24. The memory controller of claim 23, wherein the second data length is a product of the first data length multiplied by a multiplier, and the multiplier is generated according to the volume of all the logical addresses and the volume of all the spare physical blocks in the storage area.

25. The memory controller of claim 24, wherein the multiplier is a quotient of the volume of all the logical addresses divided by a value, and the value is the volume of all the spare physical blocks in the storage area.

26. The memory controller of claim 21, wherein the first data length is a length of single one of the physical pages, and the second data length is a length of multiple ones of the physical pages.

27. The memory controller of claim 21, wherein when the memory management circuit writes the first data, the memory management circuit is further configured to program at least a part of the first data according to the first write command, wherein the at least a part of the first data being programmed has a fourth data length, and the memory management circuit is configured to decide the second data length according to the fourth data length.

28. The memory controller of claim 21, wherein before the memory management circuit writes the first data, the memory management circuit is further configured to determine whether a number of the spare physical blocks is smaller than a preset number, and the memory management circuit copies the at least one valid data having the second data length to the second spare physical block when writing the first data if the number of the spare physical blocks is less than the preset number.

29. The memory controller of claim 21, wherein the at least one valid data being copied is distributively stored across different ones of the physical blocks.

30. The memory controller of claim 21, wherein the memory management circuit is further configured to show a status of the rewritable non-volatile memory module as a busy status when writing the first data and copying the at least one valid data, and the memory management circuit is further configured to erase at least one of the physical blocks, wherein the at least one valid data stored in the erased physical block are all copied to at least one of the spare physical block, and the memory management circuit is further configured to show the status of the rewritable non-volatile memory module as a non-busy status after writing the first data and copying the at least one valid data.

* * * * *